United States Patent [19]

Kneifel, II et al.

[11] Patent Number: 5,444,341
[45] Date of Patent: Aug. 22, 1995

[54] METHOD AND APPARATUS FOR TORQUE RIPPLE COMPENSATION

[75] Inventors: R. William Kneifel, II; Stephen T. Walsh, both of Cincinnati; Thomas W. Minnich, Franklin, all of Ohio; Robert M. Crovella, Rockford, Ill.; A. Harold Morser, Oxon, England

[73] Assignee: Cincinnati Milacron Inc., Cincinnati, Ohio

[21] Appl. No.: 145,557

[22] Filed: Nov. 4, 1993

[51] Int. Cl.[6] .............................................. H02P 7/00
[52] U.S. Cl. ..................... 318/432; 318/439; 318/431; 318/434
[58] Field of Search ............... 318/432, 439, 431, 434

[56] References Cited

U.S. PATENT DOCUMENTS

| | | | |
|---|---|---|---|
| 3,919,609 | 11/1975 | Klautschek et al. | 318/227 |
| 4,137,489 | 1/1979 | Lipo | 318/798 |
| 4,525,657 | 6/1985 | Nakase | 318/439 |
| 4,659,976 | 4/1987 | Johanson | 318/432 |
| 4,726,738 | 2/1988 | Nakamura et al. | 318/432 |
| 4,782,272 | 11/1988 | Buckley et al. | 318/254 |
| 4,868,477 | 9/1989 | Anderson et al. | 318/696 |
| 4,943,760 | 7/1990 | Byrne et al. | 318/701 |
| 4,980,617 | 12/1990 | Tajima et al. | 318/254 |
| 5,032,773 | 7/1991 | Frank | 318/254 |
| 5,187,417 | 2/1993 | Minnich et al. | 318/254 |
| 5,223,775 | 6/1993 | Mongeau | 318/432 |
| 5,263,113 | 11/1993 | Naitoh et al. | 318/432 |

OTHER PUBLICATIONS

Franklin, Powell, and Workman, "Digital Control of Dynamic Systems", pp. 572 ∝ 581, 1990 Addison-Wesley publication.

Primary Examiner—William M. Shoop, Jr.
Assistant Examiner—Karen Masih
Attorney, Agent, or Firm—John W. Gregg

[57] ABSTRACT

Torque ripple in brushless DC motors is reduced by compensation of signals controlling energization of motor stator windings. Motor current magnitude is compensated in response to compensation factor values correlated to the ratio of actual torque to ideal torque at constant current at various relative positions of a motor rotor and stator. A motor current command component associated with a commanded torque is compensated for cogging torque associated with motor magnetization. Measured relative position values are compensated to account for torque profile distortions associated with motor current magnitude.

20 Claims, 3 Drawing Sheets

METHOD AND APPARATUS FOR TORQUE RIPPLE COMPENSATION

BACKGROUND OF THE INVENTION

1. Field of the Invention

This invention relates generally to control of brushless DC motors. In particular this invention relates to reduction of torque ripple of brushless DC motors.

2. Description of Related Art

It is known that brushless DC motors exhibit torque variations during operation above zero velocity and which are most pronounced at relatively low speeds and when subject to high loads. Contributors to torque variations include effects related to motor current as well as effects associated with motor construction. It is recognized that DC brushless motors which are driven by stepwise motor current commutation, for example, six step commutation, demonstrate relatively greater torque variation than motors designed for and driven with sinusoidal current energization. However, stepwise commutated current energization is relatively simpler to achieve than synthesis of sinusoidal motor current. Consequently it is desirable to effect reduction of torque variation for stepwise commutated brushless DC motors.

Certain torque variations associated with motor current commutation are described in U.S. Pat. No. 4,782,272. In particular, this reference illustrates in FIG. 9 and the associated description the effects of deviation of current commutation from the point at which torques from successively energized windings are equal. This reference discloses a control for effecting commutation at a point beyond the point where the torque of successively energized windings are equal, resulting in a torque peak.

U.S. Pat. No. 4,868,477 describes a control for energizing windings of a variable reluctance motor to reduce torque ripple in positioning servos. The control of this reference includes storage for data defining the magnitude of current for each motor winding at each rotor position to produce a desired torque. The stored data is based on measured motor performance. The current control method of this reference contemplates the simultaneous energization of winding phases to achieve a desired torque magnitude at a particular position and is not suitable for effecting velocity control.

Motor control techniques for reducing torque variation associated with certain current related effects and effects produced in the absence of motor current in axial field permanent magnet motors are described in U.S. Pat. No. 5,223,775. These control techniques are directed particularly to modifying the shape and magnitude of applied sinusoidal motor current where each winding phase is controlled independently.

The known control techniques do not achieve satisfactory reduction of torque variation for brushless DC motors driven with stepwise commutated motor current while retaining comparatively simple current commutation.

SUMMARY OF THE INVENTION

It is an object of the present invention to control energization of windings of a brushless DC motor to reduce torque fluctuations.

It is a further object of the present invention to control a brushless DC motor to reduce torque fluctuations which are attributed to torque variations at constant motor current by compensation of motor current command values.

It is a still further object of the present invention to control a brushless DC motor to reduce torque fluctuations which are attributed to motor magnetization by compensation of motor current command values.

It is a still further object of the present invention to control stepwise commutation of motor current of a brushless DC motor to reduce torque fluctuations by effecting motor current commutation at the relative position of rotor and stator at which the constant motor current torques of successively energized motor windings are equal.

Further objects and advantages of the present invention shall become apparent from the following description and the accompanying drawings.

A motor control periodically produces motor current commands defining a motor current magnitude and produces commutation pattern control signals defining the instant of motor current commutation from one to another of successively energized motor windings. Each motor current command includes a current component derived from a torque command value and, for velocity control, includes a component derived from a velocity control algorithm. An adjustment angle is used to correct the commutation pattern control signals to conform the instant of motor current commutation to the instant when the rotor and stator will have a relative position at which constant motor current torques of successively energized motor windings are equal. The adjustment angle is calculated as a function of commanded motor current magnitude. The control effects compensation of current command values in two respects. First, a torque command value included in the motor current command is modified by a compensation component accounting for torque fluctuations attributable to motor magnetization. Compensation components are derived from measured motor torque in the absence of motor current at plural relative positions of the rotor and stator. Stored values of compensation components are recalled according to measured relative position of rotor and stator. A second compensation of motor current command values is effected using compensation factor values correlated to ratios of actual torque to ideal torque produced by constant motor current. The control includes data storage of compensation factor values associated with plural relative positions of motor rotor and stator. As the relative position of rotor and stator change, compensation factors are recalled and current commands are modified in response to the recalled compensation factor values. The measured relative position value used to recall the stored compensation factor data is modified by the adjustment angle.

DETAILED DESCRIPTION OF THE PREFERRED EMBODIMENT

To illustrate the invention, a motor control developed by Cincinnati Milacron Inc., the assignee of the present invention, shall be described in detail. While this motor control represents a preferred embodiment of the invention, the description thereof is not intended to be in any way limiting in respect of the scope of the invention which is defined by the appended claims and all equivalents thereof. The motor control to be described effects correction for torque variation related to motor current as well as variations associated with motor magnetization.

Figure 1A:
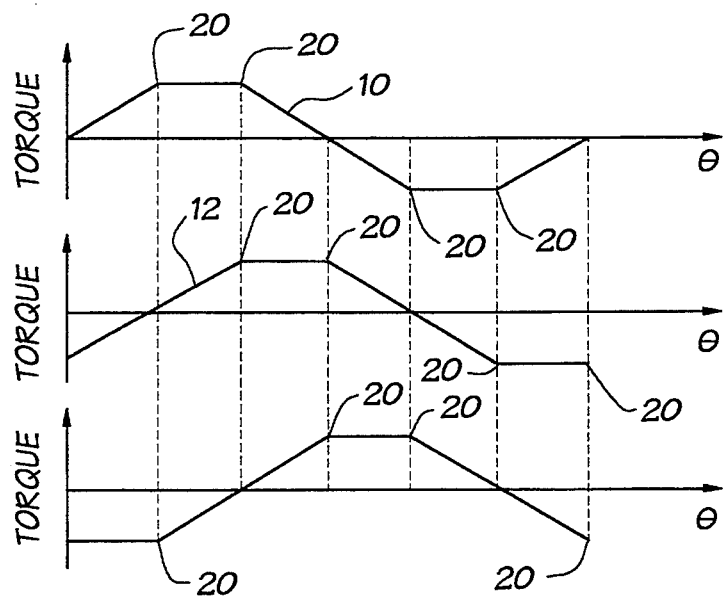
FIGS. 1a though 1c illustrate ideal and actual torque characteristics at constant motor current.
Figure 1B:
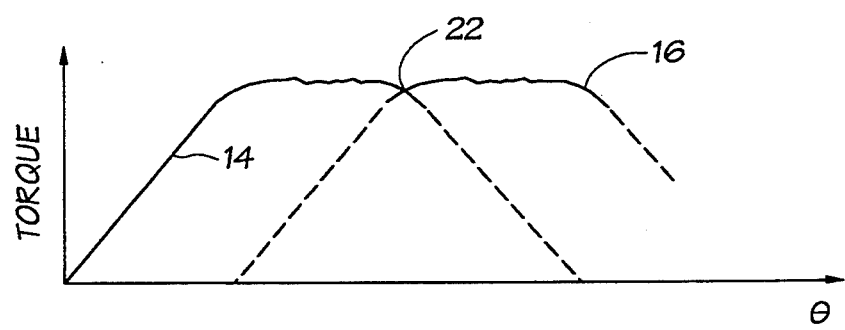
Figure 1C:
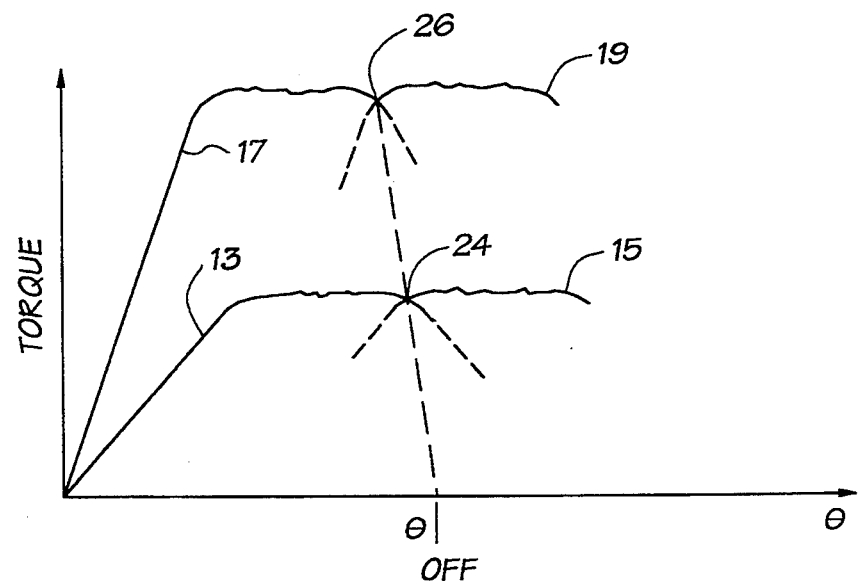

To describe the effects of motor current related torque variations corrected by the motor control of the subject application, reference shall be made to FIGS. 1a–1c which illustrate trapezoidal torque characteristic for motor windings energized with constant current, i.e. an unchanging current magnitude. The control of this invention is applicable to stepwise motor current commutation whether applied to motors having trapezoidal or sinusoidal torque characteristics.

FIG. 1a illustrates full cycles of ideal torque produced by three phases of stator windings energized with constant current in response to passage of opposing poles of a rotor. Motor construction and arrangement of the windings is designed to produce the staggered torque profiles illustrated. Each torque profile includes two constant torque portions of opposite polarity, and each constant torque portion occupies one sixth of the torque profile. It will be understood that in a motor constructed with six rotor poles, a complete cycle of a torque profile is completed with each 120° of relative rotation of rotor and stator. Torque characteristics of sinusoidal type motors exhibit substantially narrower regions of constant torque but do produce regions of relatively small torque variation within the corresponding one sixth portion of the torque profile.

It will be appreciated from FIG. 1a that the motor may be advantageously operated within the regions of constant torque of the torque profiles by controlling the selection of stator windings to be energized, and the direction of current through the windings. To achieve this type of operation, it is desired to effect commutation of current from one winding to another at the points 20 where transitions occur from constant torque. With constant motor current, the ideal characteristics of FIG. 1a would produce constant torque as phases are successively energized, that is, torque would remain constant through motor current commutation. In a motor having a sinusoidal torque characteristic, stepwise commutation of motor current at the same positional intervals will result in reduced torque regions between the narrower constant torque portions of the torque characteristic.

In contrast to the ideal torque profiles of FIG. 1a, actual motor torque characteristics exhibit a continuous change of torque at the transitions to and from constant torque. In FIG. 1b curves 14 and 16 are portions of two torque profiles, corresponding to curves 10 and 12 of FIG. 1a, spatially overlaid. While commutation will desirably occur at a location where the torque for phases to be successively energized is equal, commutation of constant motor current can not produce constant torque because of the loss of torque in the vicinity of the transitions. This effect shall be referred to as torque constant error. A torque variation likewise occurs for sinusoidal motors in the transition regions between constant torque portions of the torque characteristic. To correct for torque constant error, the control of this invention effects compensation of motor current commands in accordance with the ratio of actual torque to ideal torque at constant current. The compensated current commands overcome the loss of torque at constant current in the transition regions.

A second current related effect is illustrated by the torque profiles of FIG. 1c. There, the curves 13 and 15 correspond to the curves 14 and 16 of FIG. 1b at one constant current magnitude and the curves 17 and 19 similarly correspond at another constant current magnitude. As shown, the shape of torque characteristic profiles change with current magnitude. As a consequence of these profile changes, the points 24 and 26, corresponding to point 22 of FIG. 1b, occur at different relative positions of rotor and stator. That is, the commutation points are translated as a function of motor current magnitude. The direction of translation depends on the direction of current flow producing the torque. This positional translation shall be referred to herein as torque profile shift. To correct for this effect, the control of this invention effects adjustment of the position of occurrence of commutation of current from one winding to another. The magnitude of adjustment of commutation position is determined from a linear function joining the desired commutation points at different torque magnitudes. The linear function is defined by torque measurement data characterizing actual motor performance.

In addition to effects on torque profiles attributable to current magnitude, torque fluctuations attributable to motor magnetization occur in the absence of motor current. The physical arrangement of rotor magnets and stator poles are such that magnetic reluctance varies with relative positions of the rotor and stator. Reluctance variations are manifested in positions of the rotor and stator from which positional change is resisted and to which positional alignment is aided by magnetic forces. The resultant torque variation, is known as "cogging". To correct for this effect, the control of this invention effects compensation of a motor current command component having values determined in response to commanded torque. Compensation values are determined from measurement of motor torque in the absence of motor current.

Motor Controller

Figure 2:
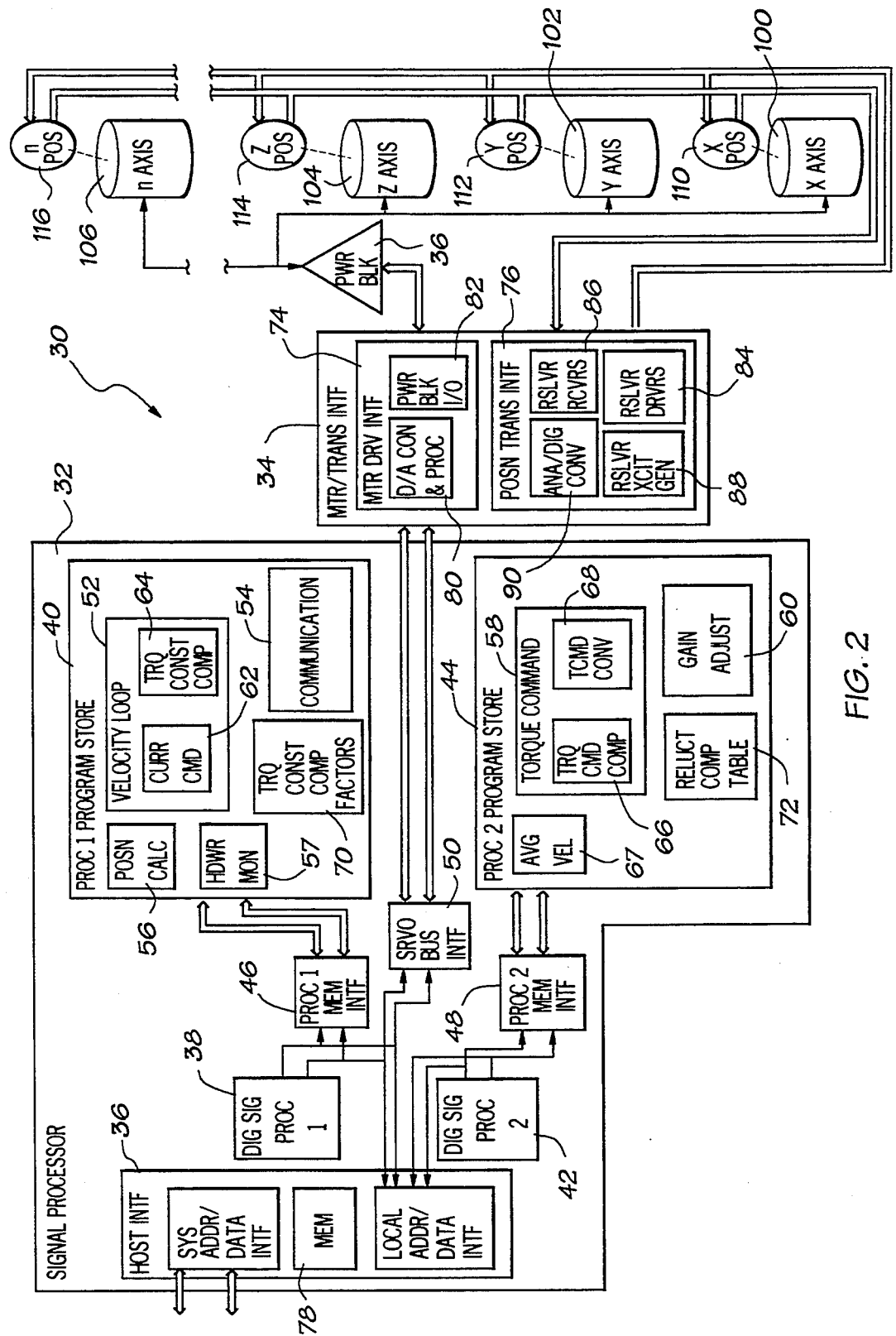
FIG. 2 is a block diagram showing a brushless DC motor and control therefore.

A motor controller according to the present invention shall be described with reference to FIG. 2. Motor controller 30 includes a signal processing module 32 and a motor and transducer interface module 34. Current switching devices located in power block module 36 control delivery of electrical current to motors 100 through 106 in response to control signals output by interface module 34. Motor controller 30 is responsive to inputs received from a host system (not shown) to perform position and velocity control of motors 100 through 106.

SIGNAL PROCESSING MODULE

Signal processing module 32 includes a host interface 37 for data communication with a host system. Host interface 37 includes a memory 78 to which data are written for exchanges between processing module processors or between the processing module and the host system. Host interface 37 also includes address and data bus interfaces which serve as signal buffers between digital signal processors of signal processing module 32 and the memory. Two digital signal processors 38 and 42 execute programs recorded in respective program stores 40 and 44 to implement motor control algorithms, perform diagnostic routines and effect communication with the host system. Applicants have chosen the TMS 320C25 digital signal processors available from Texas Instruments Inc. Servo bus interface 50 provides signal buffering for signals to be transferred from the digital signal processors 38 and 42 to motor interface module 34. Local address and data bus interfaces 46 and 48 provide signal buffers for address and data signals transferred between program stores 40 and 44 and the respective digital signal processors 38 and 42.

Motor control routines of interest for the present invention include position detection routines 56, velocity loop processing routines 52, commutation control routines 54, torque command processing routines 58, and gain adjustment routines 60. Of particular interest in respect of velocity loop processing routines are motor current calculation 62 and torque constant compensation 64. Of particular interest in respect of torque command processing routines are torque command compensation routines 66 and torque command conversion routines 68 which produce a component of motor current. Processor 1 program store 40 includes a data table of torque constant compensation factors 70. Processor 2 program store 44 includes reluctance compensation data table 72.

Signal processing module 32 effects motor control by periodic execution of routines implementing motor control algorithms at a predetermined loop closure interval. With each execution of the routines, new values of motor current commands CMD$_I$ and commutation pattern control words SEXT$_I$ are produced (the subscripts I identify the motor for which the commands and control words are effective). The commands and control words are employed by motor interface module 34 to control the delivery of electrical current to the motors 100 through 106 during the loop closure interval. In addition, the commands and control words are made available to the host system through host interface 37.

MOTOR & TRANSDUCER INTERFACE MODULE

Interface module 34 includes motor drive interface 74 and position transducer interface 76. Motor drive interface 74 includes digital to analogue conversion and processing circuitry 80 which is responsive to the motor current commands ICMD$_I$, commutation pattern control words SEXT$_I$, and measured motor current to produce control signals for the current switches of power block module 36. The switches are controlled by pulse width modulation to achieve the desired motor current magnitudes. Motor drive interface 74 includes input/output interface circuitry 82 for exchange of signals with power block module 36. A specific implementation for generating pulse width modulated switch control signals and for exchanging signals with power block module 36 is disclosed in U.S. Pat. No. 5,187,417.

In addition to generation of switch control signals, interface module 34 includes signal interfaces for position transducers 110 through 116. Position transducer interface 76 includes excitation signal interface 84 and transducer output signal receivers 86. In the preferred embodiment, position transducers are resolvers. Resolver excitation signals, fixed frequency sinusoids, are produced by resolver excitation generator 88 and conditioned by excitation signal interface 84 for output to the position transducers. Resolver output signals, SIN$_I$ and COS$_I$, are sampled at the loop closure interval and the sampled values converted from analogue to digital representations by analogue to digital converter 90. The resolver interfaces of the preferred embodiment are of known design and further details thereof shall not be provided herein.

Velocity Loop Control Algorithms

Digital processing module 32 effects velocity control to determine a motor current command value. It will be appreciated that velocity control may be effected as a subsisting control algorithm in a system effecting position control. The motor current command value produced by the velocity control defines a desired motor torque. The desired motor torque includes a component calculated to achieve a desired velocity and a component associated with torque that may be otherwise commanded. The velocity dependent component is calculated in response to a velocity error VE, i.e., the difference between a velocity command VCMD defining a desired motor velocity and actual motor velocity. In the preferred embodiment, actual instantaneous motor velocity is derived from the measured change of position occurring during the immediately preceding loop closure interval. Velocity control is selectively effected according to either proportional plus integral or pseudo derivative feedback type control algorithms.

Proportional plus integral velocity control is characterized by a control transfer function having the form:

$$KP*[(s+KI)/s]*VE$$

Where:
s represents complex frequency
KP = proportional gain factor
KI = integral gain factor $$VE = \text{velocity error}$$
$$= VCMD - VACT$$

Where:
VCMD = velocity command
VACT = actual velocity (scaled and compensated for velocity loop control)

Pseudo derivative feedback velocity control is characterized by a transfer function having the form:

$$KPDF*[KI/s]*VE-(KPDF,VACT)$$

Where:
s represents complex frequency
KPDF is a gain factor equivalent to the velocity gain factor in proportional plus integral control and the other quantities have the same definitions as in the case of proportional plus integral control.

The signal processing module 32 effects the selected type of control using effective values of the gains KI, KP, and KPDF derived from user supplied values which may be transferred to the motor control 30 from the host system. Adjustment of the gain values is accomplished through adjustment parameters PADJ, PDFADJ, and KIADJ in accordance with the following:

$$KP(\text{eff}) = PADJ*KP(\text{nominal})$$

KI(eff)=KIADJ*KI(nominal)
KPDF(eff)=PDFADJ*KPDF(nominal)

To provide increased velocity loop gain at and near zero velocity, a further gain modification factor KRO is applied in accordance with the following:

KP=(1+KRO)KP(nominal)
KI=(1+KRO)KI(nominal)
KPDF=(1+KRO)KPDF(nominal)

The change of gain during low speed operation is effected at a constant rate. The value of KRO is a user specified friction compensation multiplier which is input from numerical control 10.

A current command is produced in response to the selected type of control taking into consideration the axis moment of inertia, the motor torque constant and the current scaling associated with the pulse-width modulation control signals to be applied to the power block 36. In addition, a current component produced in response to a direct torque command input is summed with the current command component derived from the velocity loop control algorithm. Inclusion of a torque command component ITCMD in the algorithm permits entry of values from a host system thereby providing direct control to achieve a desired torque. Torque commands other than null may be used, for example, at speeds where velocity error based control can not be relied on exclusively to produce satisfactory results, for example, where velocity errors are quite small. Applicants have chosen to effect compensation for torque variations related to motor magnetization by including a compensation component in torque command TCMD.

The calculations performed to produce the current command implementing proportional plus integral control are:

$$\text{ICMD} = \text{IKP}^*\text{VE}_k + \text{IKI}^*I_k + \text{ITCMD}_k \qquad (1)$$

Where:

$I_k$ = integrator evaluation of the $k$ update interval
  = $VE_k + I_{k-1}$

Where:

$I_{k-1}$ = integrator evaluation of the k−1 update interval $IKI$ = internal integral gain
  = $(IKP^*KI^*KIADJ)/C1$ Where:

C1 = constant accounting for conversion of units including conversion of time to time per sample interval and the multiplier of KIADJ
KIADJ = integral gain adjust factor $IKP$ = internal proportional gain
  = $[KPADJ^*KRO^*(1 + JADJ)](C2^*KP^*JA)/(KT^*AS)$ Where:
AS = power block current scale factor
C2 = constant accounting for conversion of units and the multiplier of KPADJ
JA = axis moment of inertia
JADJ = moment of inertia adjust factor
KPADJ = proportional gain adjust factor
KRO = low speed gain modification factor
KT = motor torque constant (torque/amp)
ITCMD = current component associated with direct torque command
$VE_k$ = VE at the k update interval The calculations performed to produce the current command implementing pseudo derivative feedback control are:

$$\text{ICMD} = -\text{IKPDF,VACT} + \text{PKI}^*I_k + \text{ITCMD}_k \qquad (2)$$

Where:

$IKPDF$ = internal pseudo derivative gain factor
  = $[KPDF^*KRO^*(1 + JADJ)](C2^*KPDF^*JA)/(KT^*AS)$
$PKI$ = internal integral gain factor
  = $(IKPDF^*KI^*KIADJ)/C1$ and all other components have the definitions stated above.

Values of the axis moment of inertia JA, the torque constant KT, and the current scale factor AS may be supplied from the host system. Processors 38 and 42 perform integer arithmetic calculations to execute the velocity control algorithms. For clarity, the expressions of the algorithms are given without scale factors used to accommodate integer arithmetic. It will be understood that the expressions define relationships among variables and that calculations according to these relationships may be performed using floating point arithmetic whereby scaling required for integer arithmetic would be eliminated.

Torque Compensation

Applicants have chosen to effect compensation for torque constant error as described with reference to FIG. 1b by applying a factor to the current command value produced by evaluation of the selected velocity loop control algorithm. The compensated current command is computed according to relative rotor and stator position and an empirically determined compensation factor according to the following expression:

$$\text{ITCMP} = \text{ICMD} + \text{ICMD}^*\text{TCF}_{\ominus CMP} \qquad (3)$$

Where:
ITCMP is the value of a current command compensated for torque constant errors
$TCF_{\ominus CMP}$ = torque compensation factor at angular position $\ominus$, where $\ominus$ has been compensated for motor current magnitude A value for the torque compensation factor $TCF_{\ominus CMP}$ is recalled from a table using position information indicating the relative position of rotor and stator. Compensation of commanded current for a calculated ratio could be effected by multiplication of the uncompensated current value by the inverse of the ratio of actual torque to ideal torque. However, deviations from ideal torque to be compensated are relatively small so that the significant difference between values will reside in fractional portions of the values. Consequently, expression (3) has been chosen by applicants to implement the compensation calculation so that the significance of these small differences can be realized with reasonable data word lengths. Each stored factor value is computed by subtracting one from the inverse of the ratio of actual torque to ideal torque. Expression (3) is the equivalent of multiplying ICMD by the sum of one and the compensation factor value. Since the compensation factor value is computed by subtracting one from the inverse of the ratio, the effective addition of one according to expression (3) restores the one previously subtracted. The result of expression (3) considering the previous subtraction is multiplication of ICMD by the inverse of the ratio.

Actual torque values used to compute compensation factor values are determined by measurements made at constant current at different relative positions of rotor and stator. Statistical methods are used to eliminate anomalies in the measured data. Since the control effects stepwise commutation from one stator phase to another, compensation factors are required only for the portion of the torque characteristic of any stator phase during which the phase will conduct current. Further, for current in one direction, applicants have found that satisfactory compensation maybe obtained by providing a set of factor values applicable for all rotor poles rather than providing unique sets of values wherein one set is associated with each rotor pole. The number of unique compensation factor values to be used is chosen according to the quality of desired performance improvement: the more compensation factors stored, the closer the conformance of compensated performance to ideal motor behavior. Compensation factors are provided for both directions of current flow through the motor windings and current flow direction data are used in conjunction with position data to select a compensation factor to be recalled.

To correct for torque profile distortion attributable to motor current magnitude as described with reference to FIG. 1c, an adjustment is made to measured position to produce an adjusted position value. The position adjustment is calculated as a linear function joining positional shifts measured at different torque magnitudes. Separate constants of the linear slope and zero torque intercept are defined for each direction of current flow. A compensated value of measured position $\ominus CMP$ is calculated according to the following expression:

$$\ominus CMP = \ominus + K_\ominus * ICMD + \ominus_{OFF} \qquad (4)$$

Where:
$\ominus$ = measured angular position
$\ominus_{OFF}$ = zero torque intercept of linear function, unique offset value for each direction of motor current flow
$K_\ominus$ = slope constant of linear function, unique constants for each direction of motor current flow The compensated measured relative position of rotor and stator is used to recall torque compensation factor values and to calculate the instant within a loop closure interval when commutation should be effected. The compensation factor values are used in the compensation of current command values in accordance with expression (3). Use of the compensated position to calculate the instant of commutation corrects for positional shift of desired commutation points as described with reference to FIG. 1c.

Applicants have chosen to effect compensation for torque variations attributable to motor magnetization, i.e. cogging compensation, by applying compensation to the component of current command associated with a torque command value ITCMD. Cogging compensation is added to a torque command value received from the host system according to:

TCMD = TVAL + TCMP$_\ominus$

Where:
TVAL = torque command value received from host
TCMP$_\ominus$ = torque compensation value at angular position $\ominus$ The compensated torque command value is converted to units of current according to the motor torque constant to produce the torque command component ITCMD of commanded current.

The torque compensation values are determined by torque measurement at different relative positions of rotor and stator in the absence of motor current. Statistical methods are used to determine values to be stored in compensation data table 72.

Velocity Loop Control & Torque Compensation Procedures

The following detailed description of procedures executed by motor control 30 to effect velocity control and torque compensation includes tasks performed by both processors 38 and 42. While applicant has chosen to allocate tasks between the processors 38 and 42 in the manner to be described, it will be appreciated that other allocations would serve equally as well, the primary consideration being that the processing time consumed must permit completion of all required tasks during the loop closure interval.

Programs executed by signal processor 38 are stored in local memory 40 and include: actual position calculation routines 56; velocity loop control routines 52; commutation control routines 54 and hardware monitoring routines 57. Signal processor 42 operates in conjunction with programs stored in memory 44 including: torque command processing routines 58; gain adjustment routines 60; and, average velocity calculation routines 67.

The routines executed by processor 38 are subdivided into background processing and interrupt processing. Background processing effects execution of hardware monitoring procedures and occurs continuously until occurrence of an interrupt signal associated with the loop closure interval. Hardware monitoring routines 57 examine status flags indicating hardware failures which may be set during initialization or at any time a hardware failure is detected. Interrupt processing effects velocity loop control including torque constant error compensation and motor current commutation control.

Figure 3:
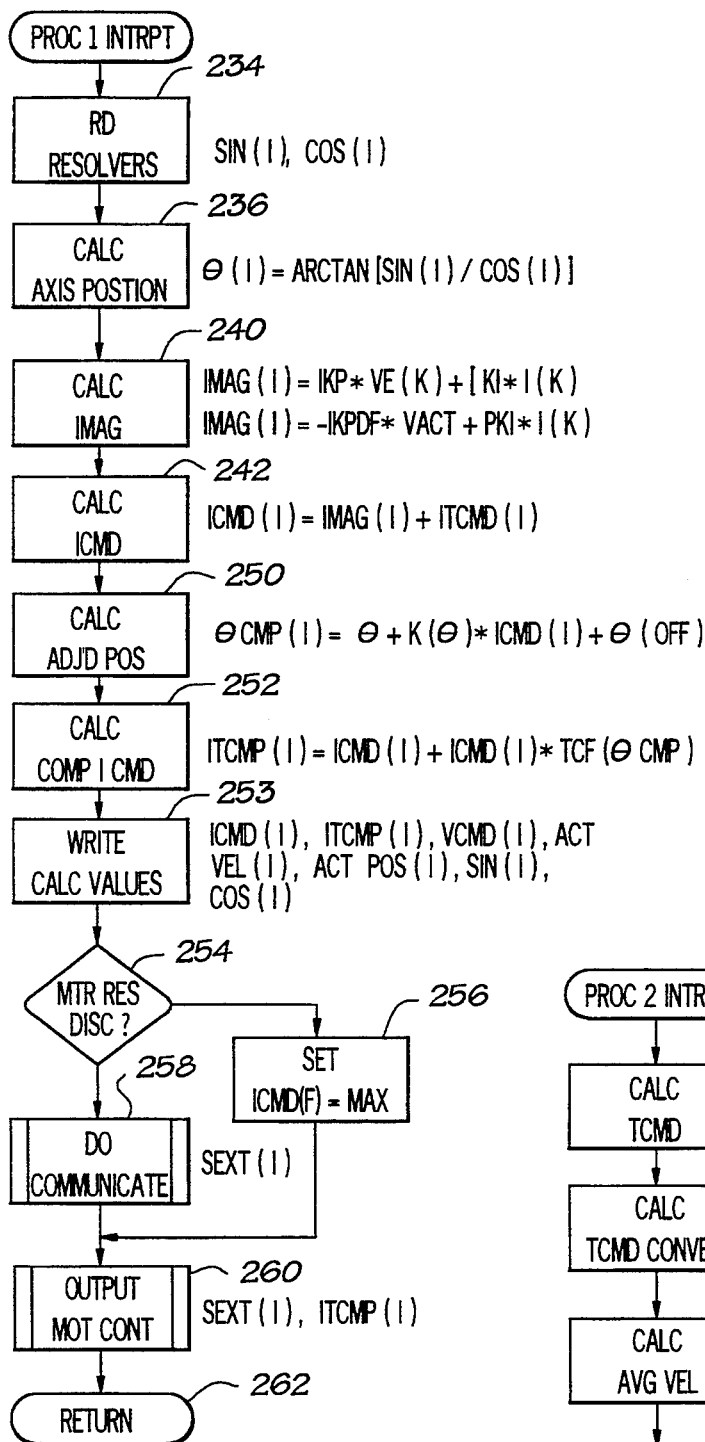
FIG. 3 is a flow chart of a procedure effected by the control of FIG. 2 for producing motor current control signals.

Upon occurrence of an interrupt signal associated with the loop closure interval, execution of the procedure illustrated by the flow chart of FIG. 3 is initiated by processor 38. The interrupt procedure begins with execution of the position measurement routines 56. At process step 234 the resolver output signals $SIN_I$ and $COS_I$ for all resolvers in use are read from interface module 34. These output signals are stored by the interface module 34 in memory locations which are directly accessible by signal processing module 32. The resolver output signals read by process step 234 are loaded into dedicated locations of memory 78. At process step 236 transducer position signals $\ominus_I$ for all axes are produced by calculation of the inverse tangent of the ratio of the resolver output signals. The calculated axis positions are represented by measurement system units defining the resolution of the measured positions.

Execution of the interrupt procedure continues at process step 240 where motor current magnitude values $IMAG_I$ are calculated as the sum of the first two terms of either equation (1) or (2) according to the type of velocity control to be effected. The value of $IMAG_I$ represents the portion of the motor current command associated with the velocity control to be implemented. The velocity error $VE_K$ and actual velocity value VACT used in the calculation of $IMAG_I$ are derived from the change of position during the loop closure interval.

At process step 242 the motor current commands $ICMD_I$ are calculated as the sum of the motor current magnitude values $IMAG_I$ and a current component derived from a compensated torque command. The effect of step 242 is completion of calculation of current command values according to equation (1) or (2) depending on the type of velocity control.

Execution of the interrupt procedure continues at process step 250 where compensated values of measured position $\ominus CMP_I$ are calculated in accordance with equation (4) using the values of motor current magnitudes $ICMD_I$ produced by process step 242. The compensated values of measured position are used in the generation of commutation pattern control signals and compensation of motor current commands. At process step 252 the current command value is compensated for torque constant error according to expression (3) using a compensation factor recalled from store 70. At process step 253 values of the motor current commands $ICMD_I$, compensated current commands $ITCMP_I$, actual velocity $VACT_I$, actual position $\ominus_I$, and sine and cosine outputs of the position transducers $SIN_I$ and $COS_I$ are written to memory 78 for access by the host system.

Execution of the interrupt procedure continues with execution of the commutation control routines 54 beginning at decision step 254. There it is determined whether any of the status flags have been set indicating that a loss of feedback has been detected by interface module 34. In the event a loss of feedback is detected the current command $ICMD_F$ associated with the failed position loop is set equal to a maximum value at process step 256. If no disconnection has been detected new commutation pattern control signals $SEXT_I$ are produced at process step 258. Process step 258 is skipped in connection with any motor for which a loss of feedback has been detected. This has the effect of ceasing commutation of stator coil current for the associated motor while maintaining the applied current at a maximum value to effect magnetic detenting of the motor. The loss of feedback is indicated to the host by an output from signal processing module 32 through host interface 37.

A set of commutation pattern control signals is associated with rotor relative position by means of a conversion table using a calculated anticipated relative position of rotor and stator. The relative position of rotor and stator expected to be attained during the next loop closure interval is calculated as the sum of the compensated measured position $\ominus CMP$ and the product of the average relative velocity $VAVG_I$ and the loop closure interval time $\delta t$. As noted with reference to FIG. 1a, commutation of motor current among the windings of a three phase stator network is effected at six equal angular zones or sextants of the torque characteristic of a single stator phase. Each zone is related to a segment of one revolution of the rotor according to the number of rotor poles. With a motor having a six pole rotor, each zone corresponds to twenty degrees of relative rotation of rotor and stator. Each zone is associated with a set of commutation pattern control signals from which the conductive state of the stator coils is determined as follows:

| Zone (radians) | Sextant | Sextant Data S3 | S2 | S1 | U V W Conduction CW | CCW |
|---|---|---|---|---|---|---|
| $0-\pi/3$ | 1 | 0 | 0 | 1 | W to V | V to W |
| $\pi/3-2\pi/3$ | 2 | 0 | 1 | 0 | U to V | V to U |
| $2\pi/3-\pi$ | 3 | 0 | 1 | 1 | U to W | W to U |
| $\pi-4\pi/3$ | 4 | 1 | 0 | 0 | V to W | W to V |
| $4\pi/3-5\pi/3$ | 5 | 1 | 0 | 1 | V to U | U to V |
| $5\pi/3-0$ | 6 | 1 | 1 | 0 | W to U | U to W |

Where:
CW = clockwise torque
CCW = counter-clockwise torque
U, V, and W designate terminals of the stator coil winding network and conduction is defined in the direction of positive toward ground The desired direction of torque and hence, the direction of conduction, is defined by the sign of the current command.

While the loop closure interval is fixed, the interval of change of commutation patterns is a function of velocity. It is therefor necessary to determine the instant within the loop closure interval at which the relative position of rotor and stator is anticipated to traverse a zone boundary. The anticipated time for the rotor relative position to reach the zone boundary is calculated by dividing the distance between the current relative position, as indicated by the compensated measured position $\ominus CMP$, and the zone boundary by the measured velocity. The calculated anticipated commutation time is divided by a predetermined loop closure sub-interval chosen to produce an acceptable error between actual and ideal relative position at the instant of commutation at the maximum anticipated velocity. A commutation anticipation time TC is represented by the binary equivalent of the calculated number of loop closure sub-intervals and is included in each commutation pattern control word $SEXT_I$.

Execution of the commutation routines 54 is completed at process step 260 where the current commands $ICMD_I$, and commutation pattern control words $SEXT_I$ including commutation anticipation times $TC_I$ are written to dedicated storage locations for the interface module 34. Following completion of process step 260 interrupt procedure processing ends and processor 38 returns to execution of the background routines through the return of terminal 262.

Tasks performed by signal processor 42 include gain value adjustment, compensation of torque commands, calculation of average velocity and generation of the torque dependent current component used in the calculation of current commands $ICMD_I$. Gain adjustment is performed during background processing and includes execution of routines to adjust values of velocity loop gains $KP_I$, $KI_I$ and $KPDF_I$. The other tasks are performed in response to occurrence of loop closure interrupt signals. The interrupt signal used to initiate execution of the interrupt procedure of FIG. 3 by processor 38 also initiates the execution of the interrupt procedure of FIG. 4 by processor 42. It will be understood therefore, that the processing of interrupt procedures by the processors 38 and 42 occurs simultaneously.

Figure 4:
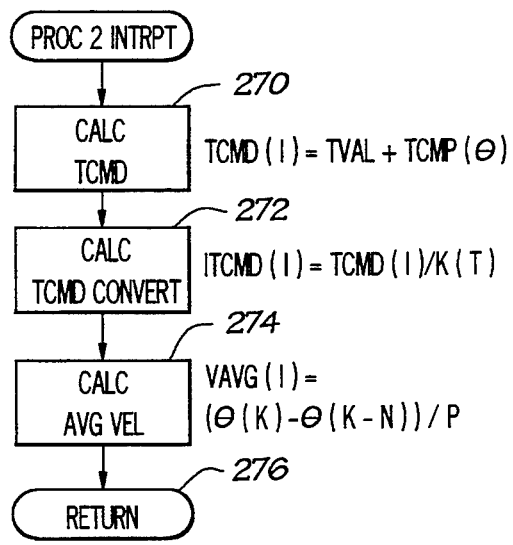
FIG. 4 is a flow chart of a procedure effected by the control of FIG. 2 for producing values used in the procedure of FIG. 3.

Upon occurrence of an interrupt signal, execution of torque command processing routines 58 is initiated at process step 270 of FIG. 4. There, a torque command $TCMD_I$ is calculated as the sum of a torque value TVAL supplied from the host system and a torque compensation $TGMP_\ominus$. Torque compensation $TCMP_\ominus$ has a value effective to correct for torque attributable to motor magnetization at rotor relative position $\ominus$. Compensation values are stored in reluctance compensation data table 72 so as to be accessible using an address derived from actual position data $\ominus$. Since this compensation is not related to motor current magnitude, the uncompensated positions $\ominus_I$ are used to retrieve the compensation value.

Interrupt procedure processing continues with execution of the torque command conversion routines 68 at process step 272. These routines are used to convert the torque command $TCMD_I$ from engineering units to current command units using values of the appropriate torque constant KT. The torque dependent current component $ITCMD_I$ value is stored in memory 78 for access by processor 38.

Processing of the interrupt procedure proceeds with execution of the average velocity calculation routines 67 at process step 274. Motor average velocity is calculated for each motor under control as the average change of relative position of rotor and stator over a predetermined number of loop closure intervals as follows:

$$VAVG = (\ominus_k - \ominus_{k-n})/p$$

Where:
$\ominus$ = rotor relative position
p = the number of loop closure intervals used for averaging
and k and k-n designate values for respectively the current and the $p^{th}$ previous loop closure intervals Average velocities $VAVG_I$ are stored in memory 78 for access by processor 38 which uses the average velocity values in connection with execution of the commutation control routines 54. Upon completion of the calculation of average actual motor velocity, execution of the background programs is continued by return through terminal 276.

While a preferred embodiment for achieving reduction of torque fluctuations in operation of brushless motors has been illustrated and described in considerable detail, there is no intention to limit the invention to such detail. On the contrary, it is intended that the scope of the invention be considered to include all modifications, alterations and equivalents falling within the spirit and scope of the appended claims.

We claim:

1. A method for controlling a brushless DC motor in response to a current command value defining a desired torque according to a predetermined motor torque constant, the motor including a rotor moveable relative to a stator and stator windings electrically energizable to produce torque acting relatively on the rotor and stator, the method comprising the steps of:
   a. producing position signals representing the position of the motor rotor relative to the motor stator;
   b. producing in response to the position signals a torque compensation factor correlated to a ratio of actual torque to ideal torque produced by constant motor current at the relative position of rotor and stator represented by the position signals, said ideal torque being constant over a range of rotor position;
   c. producing a compensated current command value in response to the current command value and the torque compensation factor, the compensated current command value defining a magnitude of motor current to produce the desired torque at the relative position of rotor and stator represented by the position signal; and
   d. controlling a magnitude of current through the stator windings in response to the compensated current command value.

2. The method of claim 1 further comprising the step of executing a velocity control algorithm relating a desired velocity and measured velocity to produce a current magnitude value to which the current command is correlated, the current magnitude value derived from the magnitude of difference between actual motor velocity and desired motor velocity.

3. The method of claim 1 wherein the step of producing a compensated current command value further comprises the steps of:
   a. producing a torque compensation value in response to the position signals, the torque compensation value representing the magnitude of torque produced in the absence of motor current at the position of the motor rotor relative to the motor stator represented by the position signals; and
   b. modifying the current command value in response to the torque compensation value.

4. The method of claim 1 further comprising the steps of:
   a. producing commutation pattern control signals in response to changes of position of the motor rotor relative to the motor stator as determined from the position signals, the commutation pattern control signals defining stepwise commutation of patterns of conduction of motor current through the stator windings to produce torque in a desired direction; and
   b. controlling conduction of motor current through the stator windings in response to the commutation pattern control signals.

5. The method of claim 4 further comprising the step of producing a compensated position value in response to the current command value and the position signals, the compensated position value defining a position at which stator windings to be successively energized produce equal torque at the current magnitude defined by the current command value.

6. The method of claim 5 wherein the compensated position value is used to determine the torque compensation factor.

7. The method of claim 5 wherein the commutation pattern control signals are produced in response to the compensated position value.

8. A method for controlling a brushless DC motor in response to a current command defining a desired torque, the motor including a rotor moveable relative to a stator and stator windings electrically energizable to produce torque acting relatively on the rotor and stator, the method comprising the steps of:
   a. producing position signals representing the position of the motor rotor relative to the motor stator;
   b. producing a torque compensation value in response to the position signals, the torque compensation value representing the magnitude of torque produced in the absence of motor current at the relative position of rotor and stator represented by the position signals;

c. modifying the current command value in response to the torque compensation value; and d. controlling a magnitude of energization of the stator windings in response to the current command value as modified.

9. The method of claim 8 further comprising the steps of:

a. producing commutation pattern control signals in response to changes of position of the motor rotor relative to the motor-stator as determined from the position signals, the commutation pattern control signals defining stepwise commutation of patterns of conduction of motor current through the stator windings to produce torque in a desired direction; and b. controlling conduction of motor current through the stator windings in response to the commutation pattern control signals.

10. The method of claim 9 further comprising the step of producing a compensated position value in response to the current command value and the position signals, the compensated position value defining a position at which stator windings to be successively energized produce equal torque at the current magnitude defined by the current command value.

11. The method of claim 10 wherein the commutation pattern control signals are produced in response to the compensated position value.

12. The method of claim 9 further comprising the steps of:

a. producing in response to the position signals a torque compensation factor correlated to a ratio of actual torque to ideal torque produced by constant motor current at the position of the motor rotor relative to the motor stator represented by the position signal;

b. producing a compensated current command value in response to the current command value as modified and the torque compensation factor, the compensated current command value defining a magnitude of motor current to produce the desired torque at the position of the motor rotor relative to the motor stator represented by the position signal.

13. The method of claim 12 wherein the compensated position value is used to determine the torque compensation factor.

14. An apparatus for controlling a brushless DC motor in response to a current command defining a desired torque, the motor including a rotor moveable relative to a stator and stator windings electrically energizable to produce torque acting relatively of the rotor and stator, the apparatus comprising:

a. means for producing position signals representing the position of the motor rotor relative to the motor stator;

b. means for producing commutation pattern control signals in response to changes of relative position of the rotor and stator as determined from the position signals, the commutation pattern control signals defining stepwise commutation of patterns of conduction of motor current through the stator windings to produce torque in a desired direction;

c. means for compensating the current command in response to the position signals, the compensations effected being correlated to deviations of actual torque from desired torque at the position represented by the position signals, desired torque being constant over a range of rotor position in response to constant motor current; and d. means responsive to the commutation pattern control signals and the current command as compensated to control energization of the stator windings.

15. The apparatus of claim 14 wherein the means for compensating the current command further comprises:

a. means for producing a torque compensation value in response to the position signals, the torque compensation value representing the magnitude of torque produced in the absence of motor current at the position of the motor rotor relative to the motor stator represented by the position signals; and b. means for modifying the current command value in response to the torque compensation value.

16. The apparatus of claim 14 wherein the means for compensating the current command further comprises:

a. means for producing in response to the position signals a torque compensation factor correlated to a ratio of actual torque to ideal torque produced by constant motor current at the position of the motor rotor relative to the motor stator represented by the position signal; and b. means for producing a compensated current command value in response to the current command value and the torque compensation factor, the compensated current command value defining a magnitude of motor current to produce the desired torque at the position of the motor rotor relative to the motor stator represented by the position signal.

17. The apparatus of claim 14 further comprising means for producing a compensated position value in response to the current command value and the position signals, the compensated position value defining a position at which stator windings to be successively energized produce equal torque at the current magnitude defined by the current command value.

18. The apparatus of claim 14 further comprising means for producing a current command value correlated to a current magnitude value produced in response to a velocity control algorithm relating a desired velocity and measured velocity, the current magnitude value derived from the magnitude of difference between actual motor velocity and desired motor velocity.

19. The apparatus of claim 17 wherein the means for producing commutation pattern control signals are responsive to the compensated position value and the commutation pattern control signals effect commutation at the position represented by the compensated position value.

20. The apparatus of claim 17 wherein the means for modifying the current command is responsive to the compensated position value and the current command is effective to conform torque produced to desired torque at the position represented by the compensated position value.

* * * * *